June 18, 1963 F. J. DEAN, JR 3,094,189
AIR MIXING AND SOUND ATTENUATING CHAMBER
Filed April 21, 1961 2 Sheets-Sheet 1

INVENTOR.
Frank J. Dean, Jr.
BY
ATTORNEY.

June 18, 1963   F. J. DEAN, JR   3,094,189
AIR MIXING AND SOUND ATTENUATING CHAMBER
Filed April 21, 1961   2 Sheets-Sheet 2
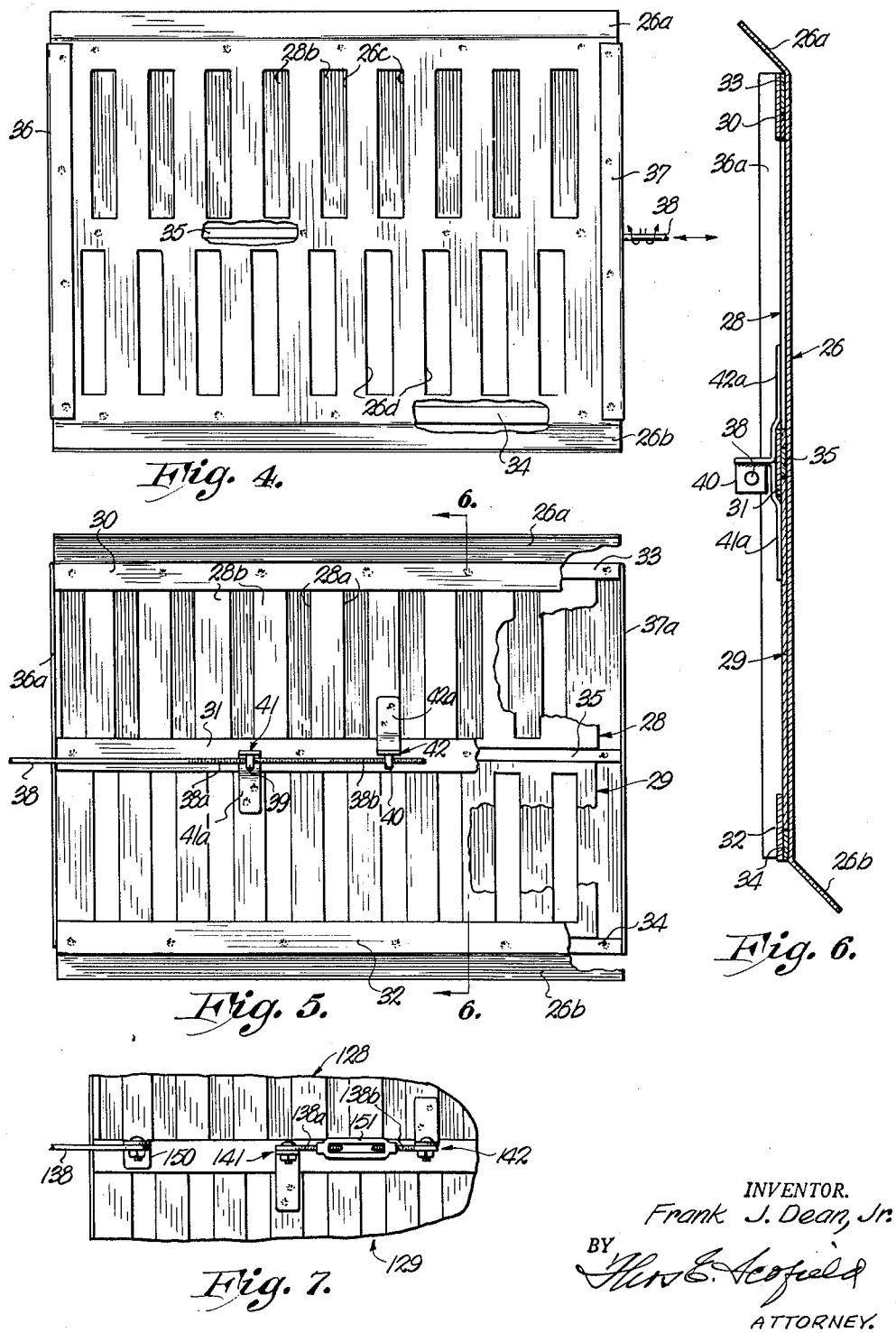
INVENTOR.
Frank J. Dean, Jr.
BY
ATTORNEY.

3,094,189
AIR MIXING AND SOUND ATTENUATING
CHAMBER
Frank J. Dean, Jr., Kansas City, Mo., assignor to Tempmaster Corporation, a corporation of Missouri
Filed Apr. 21, 1961, Ser. No. 104,640
7 Claims. (Cl. 181—36)

This invention relates generally to air conditioning equipment and refers more particularly to equipment for high velocity systems having two sources of conditioned air and in which quantities of air from said sources are intermixed at the room or other enclosure in the proportional amounts necessary to meet a specific design or load condition.

In systems of the character described, year around conditioning is achieved by providing relatively cool and relatively warm air to the enclosure and controlling the amounts actually delivered in accordance with the tempering required to bring the enclosure to the design condition. In the wintertime normally more warm air than cool air will be admitted, although the amounts will vary in accordance with the heat load in the enclosure. Conversely, in the summer, the cool air will predominate. The desired design condition is achieved by balancing the flow of the warm and cool air to result in a mean conditioned air which will offset the heat load or loss to which the enclosure is subjected.

One of the principal objects of the present invention is to provide a single air mixing device to which the warm and cool air conduits can be connected and which under the manipulation of a single control element can be operated either manually or automatically to deliver a properly tempered mixture to the enclosure, which mixture is uniform throughout. It is one of the features of my invention that the construction employed causes intimate mixing of the air within the device, thus to avoid stratification in the discharge stream and further, that but a single control element is necessary to vary the relative proportions through the range from warm air only to cold air only.

Another important object of the invention is to provide a mixing and air delivery device which, in addition to achieving thorough mixing of the differently conditioned air quantities, brings about their effective delivery to the room or enclosure while inhibiting noise transmission from the duct system. This application is a continuation-in-part of my co-pending application Serial No. 570,157, filed March 7, 1956, now abandoned which discloses a single duct outlet containing features of the present invention.

A further object of the invention is to provide an airmixing device for multiple duct systems in which a substantially constant volumetric discharge of tempered air to the enclosure is maintained while permitting variation in the relative proportions of the differently conditioned air quantities included in said tempered air. A special and highly important feature of the invention in this respect is the provision of means whereby the volumetric discharge rate can be adjusted to increase or decrease it while still preserving the ability to vary the proportions of air from the different sources so as to change the temperature of the mixture being discharged.

Still another object of the invention is to provide a mixing device of the character described which is relatively small in over-all size, is constructed of inexpensive material, and which can be manufactured and assembled with ease and facility.

Other and further objects of the invention together with the features of novelty appurtenant thereto will appear in the course of the following description.

In the accompanying drawings which are to be read in conjunction with the specification, and in which like reference numerals indicate like parts in the various views;

FIG. 4 is an enlarged plan view of the outlet side of the valving structure alone, parts being broken away for purposes of illustration;

FIG. 5 is an enlarged plan view of the inlet side of the valving structure alone, parts again being broken away for purposes of illustration;

FIG. 6 is a greatly enlarged cross section of the valving structure taken generally along the line 6—6 of FIG. 5 in the direction of the arrows; and FIG. 7 is a fragmentary view illustrating the central portion of the outlet side of the valve structure having a modified proportion adjusting means.

Figure 1:
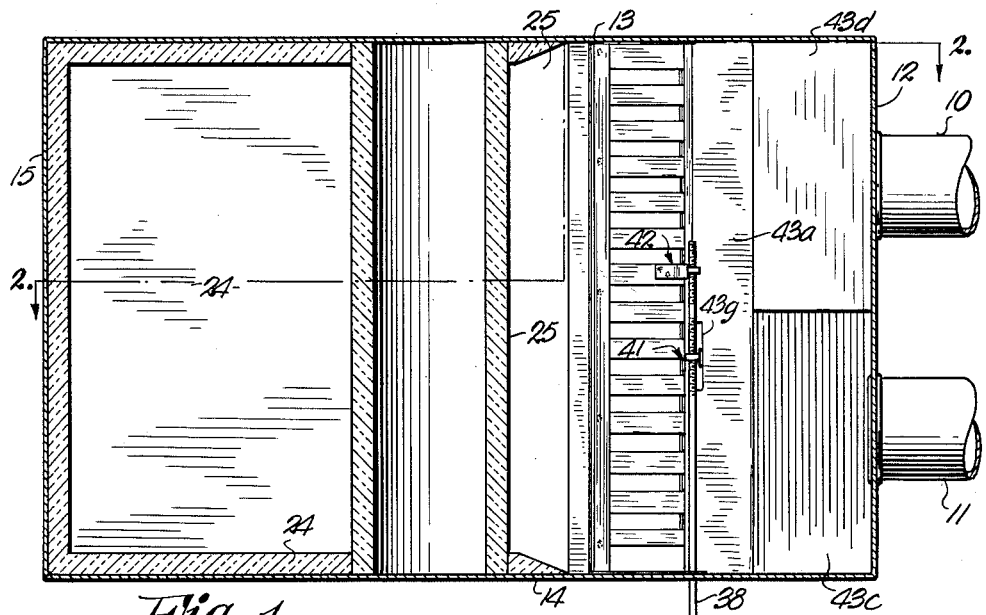
FIG. 1 is a sectional view of a typical mixing and discharge device embodying the features of my invention, the section being taken generally along line 1—1 of FIG. 2 in the direction of the arrows.
Figure 2:
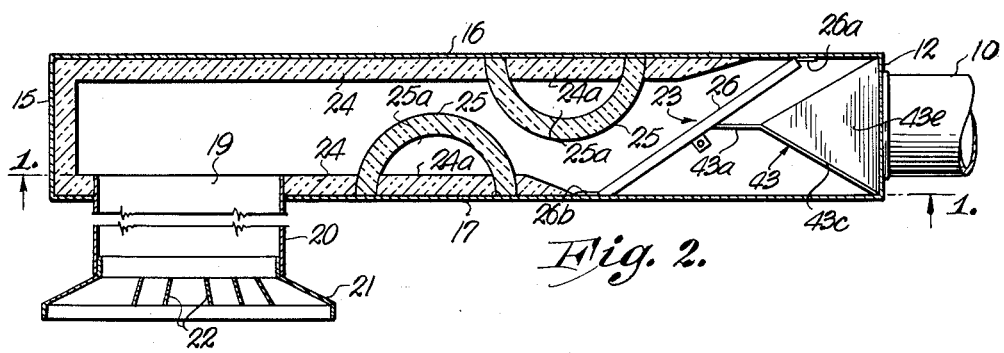
FIG. 2 is a sectional view taken along the line 2—2 of FIG. 1 in the direction of the arrows.
Figure 3:
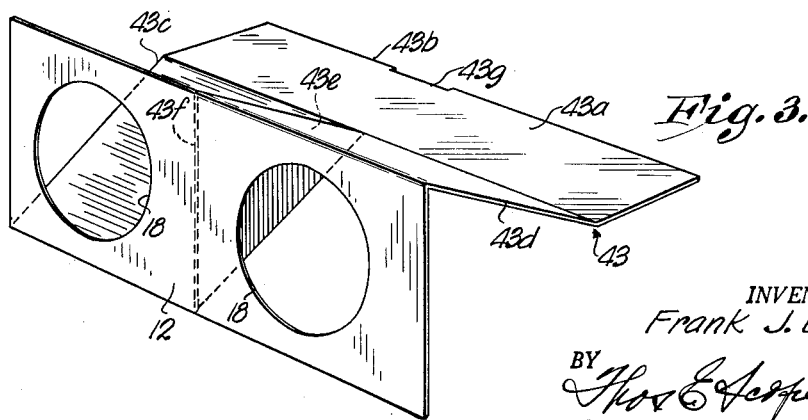
FIG. 3 is an enlarged perspective view of the inlet end of the casing and associated flow directing structure, the parts having been disassociated from the assembly in order to reveal certain features thereof.

Referring to the drawings, and initially to FIGS. 1 and 2, the reference numerals 10 and 11 indicate a pair of spaced conduits or ducts which lead from suitable sources (not shown) of differently conditioned air. For purposes of explanation, it will be assumed that the duct 10 is connected with a source of relatively cool air, while duct 11 carries the relatively warm air. Both ducts are coupled with and discharge into the inlet end 12 of a rectangular casing having the side walls 13 and 14, opposite end wall 15, top wall 16, and bottom wall 17. The casing may conveniently be constructed of sheet metal, apertures 18 (FIG. 3) being provided in the inlet end 12 to receive the ducts 10 and 11. In the illustrated embodiment a relatively large discharge outlet 19 is provided in the bottom wall 17. Connected with outlet 19 is a depending rectangular discharge housing 20 open at its upper and lower ends and provided on its lower end with a flared outlet 21 equipped with louvers 22.

It will be understood that the particular apparatus shown is that which would be employed for ceiling discharge within an enclosure. However, as will become apparent in the course of the description, the principles of the invention are equally applicable to sidewall outlets or to intermediate locations in the duct system.

Positioned within the casing near its inlet end is an air valve or damper assembly generally indicated by reference numeral 23. The valving structure controls the air flow through the casing. The details will be taken up at a later point herein.

Substantially the entire inner surface of the casing is lined with a fibrous mat or layer generally indicated by reference numeral 24. I have found that especially good acoustical results are obtained with a mat composed of glass fibers bonded together in an open reticulate network with a thermosetting resin binder. The percentage of binder is such that the fibers are joined only at their intersections so as to provide within the body of the mat a multiplicity of dead air spaces, for example, 15% to 60% by weight, based on the weight of the fibers. Such a mat has good dimensional stability and is quite resilient. I prefer a mat in which the fiber diameter is in the range of 7 to 11 microns, an average of 9 microns being preferred. The preferred density of the mat is 3 lbs. per cubic foot, the thickness being approximately one inch. The mat is adhered on one side to the inner surface of the box by any suitable adhesive, for example, a rubber base cement.

Located intermediate the ends of the casing are a pair of staggered flow intercepting members 25. It will be noted that members 25 have a concavo-convex form, preferably comprising elongate arcuate or semi-circular sections which are disposed transversely to the path of the air flow and extending across the casing. Portions of the side wall liner 24 are cut away to receive the ends of members 25, the cuts being semi-circular to conform to the curvature of members 25 so that the latter will be held in position in the casing by engagement at each end with the liner material. While I have found that the members will be adequately supported by their engagement in the cutout portions, nevertheless, if desired the edges may be adhered to the top and bottom walls also. The liner is interrupted in the vicinity of the members 25 to receive the edges of the latter. The casing surfaces located within and encompassed by members 25 are preferably covered with the lining material as indicated at 24a. By virtue of the concavo-convex configuration of the members 25, open resonance chambers 25a are defined therein.

It will be observed that members 25 are provided with dimensions relative the dimensions of the casing which insure that they overlap one another in a horizontal direction, and thus provide a tortuous path for the air as it passes through the casing from the inlet and through the valving structure 23 toward the discharge. For reasons which will subsequently appear it is desirable to have the upper member 25 fairly close to the valving structure 23.

The members 25 are composed of a fibrous structure in which the fibers are bonded together in an open reticulate structure by heat reactive binder so that the structure can be molded to a permanent concavo-convex shape. The features of a fiber structure suited for use in this invention are that it has a great deal of inherent resiliency, yet is self-supporting in the shape to which it is molded; that it is of low density and honeycombed throughout with interstitial air spaces of relatively small size; and that its surface is sensitive to deformation by and absorption of sound vibrations varying through a wide range of frequencies. An example of a suitable composition is one in which the fibers are of glass, the fibers being predominantly of a diameter of 10 microns or less, an average of 4 microns producing optimum results. Many heat reactive binders are suitable, for example, phenol condensation products, melamine resins, urea formaldehyde resins, urea melamine resins, vinyl chloride acetate resins or the like. The weight of the binder with respect to the weight of the finished product should lie between about 17% to 55% by weight based on the weight of the glass fibers. The density of such a mat should be approximately 2 to 5 lbs. per cubic foot with the best results obtained at approximately 3 lbs. per cubic foot.

Turning now to a more detailed description of the damper or air valve structure 23, and referring in addition to FIGS. 4, 5 and 6, the main body thereof comprises a stationary plate member 26 having oppositely inclined edges 26a and 26b which are joined to the top and bottom walls 16 and 17, preferably by welding. The dimensions of the stationary plate are such that it completely fills the cross-sectional area of the inside of the casing. It is inclined with respect to the end walls. For best results the angle of the plate member with respect to the angle of the walls is approximately 45°.

As may best be seen in FIG. 4, the stationary plate member is provided with two parallel horizontal rows of vertically elongated openings or apertures 26c and 26d, respectively. The apertures of the upper row are staggered longitudinally with respect to those of the lower row. The apertures in each row are of equal size with each other and with those of the other row, and the spacing of the apertures in the rows is equal likewise, the spacing being slightly greater than the width of the apertures. The longitudinal offset of the upper apertures with respect to the lower apertures is one-half the width of the apertures as will be evident by referring to the drawings.

Superposed against the stationary plate member on that side confronting the ducts 10 and 11 and capable of sliding movement lengthwise of the stationary plate member are a pair of coplanar, apertured movable plate members 28 and 29. Each movable plate is rectangular in shape with the long axis extending lengthwise of member 26. The width of each movable plate is slightly less than one-half the width of the stationary member. The upper movable plate 28 is associated with the upper apertures 26c of the stationary plate member, while the lower movable plate 28 is associated with apertures 26d. As will later be made clear, the movable plates are reciprocable lengthwise of the stationary plate member to progressively cover and uncover the apertures 26c and 26d of the stationary plate member during operation.

The movable plate members 28 and 29 are loosely confined in parallel relation with the stationary plate member through the medium of guide strips 30, 31 and 32 which overlie the upper and lower edges of the respective movable plate members. The upper guide strip 30 is spaced from the face of the stationary plate 26 by a spacer strip 33 which is joined to the guide strip and the stationary plate by spot welding at intervals. A similar spacer strip 34 is provided behind the lower guide strip 32. As will be evident from FIG. 6, the upper guide strip 30, spacer 33, and adjacent portion of plate 26 form a linear guide channel for the upper edge of the upper movable plate 28, while the lower edge of strip 32, spacer strip 34, and adjacent portion of the stationary plate member form a similar guide channel for the lower edge of lower movable plate 29. The central guide strip 31 which overlaps the lower edge of upper plate 28 and upper edge of lower plate 29 is likewise spaced from the stationary plate member 26 by a spacer strip 35. The spacer strip 35 is disposed between the upper and lower edges of the movable plates 28 and 29 and with the central guide strip 31 cooperates with the stationary plate member to form similar guide channels in which the near edges of the respective movable plates ride.

It is important to note that the length of each movable plate 28 or 29 is such that each is capable of being shifted lengthwise a limited distance with respect to the stationary plate member. To provide stops at the opposite ends of the stationary plate member, secured thereto are angle strips 36 and 37, respectively, having the outturned legs 36a and 37a which form flanges at the opposite ends of the stationary plate 26 operable to limit the permissible degree of sliding movement of the movable plate members within a predetermined range. More will be said of this later.

It will be observed that the upper movable plate 28 is formed with a pattern of vertically elongated openings 28a which, in size and spacing, are identical to the apertures 26c of the stationary plate member. The width and length of each solid portion 28b between a pair of openings is sufficient to fully cover a corresponding aperture 26c of the stationary plate. It will be noted that as shown in FIGS. 4 and 5 the upper plate member 28 is at the moment so positioned relative to the aperture 26c in the stationary plate that the solid portions 28a overlie and completely close the latter so that no air is permitted to flow through the upper apertures 26c. In this position the left-hand end of plate member 28 (as viewed in FIG. 5) abuts the flange 36a so that the only permissible movement is to the right. The right-hand end of upper plate member 28 in the position illustrated in FIG. 5 is spaced from the limiting flange 37a. The spacing is such as to permit sufficient movement of the upper plate member to the right as to fully uncover the apertures 26c of the underlying stationary plate member, that is, align the openings 28a of the movable plate member with the apertures 26c.

It will thus be evident that upper plate 28 has two extreme limit positions; one is that shown in FIG. 5 where the apertures 26c are completely covered by the solid portions 28b and the other is the position in which the movable plate is shifted to the right and engaged at its right-hand end with flange 37a, which results in complete uncovering of apertures 26c. Obviously as the upper plate is moved to the right it can be stopped at any intermediate point so as to leave the apertures 26c in partially covered condition ranging from full close to full open, depending on the extent of movement.

The lower movable plate member 29 controls the apertures 26d of the stationary plate member in the same manner as the upper plate member 28 controls apertures 26c, but in inverse relationship. The pattern of openings 29a of the lower plate member is such that when the left hand end of the lower plate member (as viewed in FIG. 5) is butted against the flange 36a, the apertures 26b are full open rather than closed. In other words, in this position the openings 29a of the lower plate member are aligned and register with the apertures 26b. As in the case of the upper plate, the lower plate 29 has a length less than the distance between the flanges 36a and 37a so as to permit reciprocation lengthwise between the extreme limit positions, one of which is illustrated in FIGS. 4 and 5. The other limit position for the lower plate member is determined by engagement of the right hand end with flange 37a at which time the apertures 26d are completely covered. For any position of the lower plate member between its limiting positions, the apertures 26d are only partially covered.

The movable plate members 28 and 29 are coupled with one another for simultaneous movement through the medium of a tying arrangement which includes the elongate control rod 38. Rod 38 is provided with the oppositely pitched threaded portions 38a and 38b, each of which has threaded connection with a similarly tapped lug 39 and 40, respectively. The lug 39 is affixed to the lower plate 29 by means of a generally L-shaped bracket 41 having the flat portion 41a spot welded or otherwise affixed to a solid portion of the lower plate below guide strip 31. A similar bracket 42 having flat portion 42a affixed to the upper plate member 28 carries the lug 40. It will be evident that brackets 41 and 42, where they overlie guide strip 31, are sufficiently spaced therefrom as to permit sliding of the plate members and brackets between flanges 36a and 37a.

As will be noted from FIG. 1, control rod 38 projects outside the casing, passing freely through a suitable aperture in side wall 14. It is thus possible through longitudinal shifting of the rod to control the position of the plates and establish any proportion desired between the areas of opening uncovered respectively by the upper and lower plate members. Thus, by shifting rod 38 to the right, as viewed in FIG. 5, the apertures 26c will be progressively closed by portions 28b of the upper plate member 28, while apertures 26d will be progressively uncovered. The arrangement and pattern of the openings in plate members 28 and 29 is such that for any position of the plates, the total uncovered areas of apertures 26c and 26d remains constant. Thus, when apertures 26c are one-third open, apertures 26d are one-third closed, and so on through the full range of movement of the plates.

Returning now to the inlet end of the device, that is the end coupled with the ducts 10 and 11, interposed between the stationary plate member 26 and the inlet end wall 12 is an air directing baffle 43. As best seen in FIGS. 1, 2 and 5, baffle 43 is provided with a straight web-like portion 43a joined at its inner edge 43b to the central guide strip 31 on the stationary plate member. Formed integral with portion 43a and extending in oppositely inclined direction therefrom are extensions 43c and 43d which join the end wall 12. The inner edges of the extensions are connected by a vertical divider 43e which is located between ducts 10 and 11 and also abuts end wall 12 as shown at 43f in FIG. 5. The inner edge 43b of the central web-like portion 43a is provided with a notch or recess 43g adapted to accommodate movement of bracket 41 as the plates are shifted.

As will be evident, the flow directing baffle 43 serves to so guide the air entering through ducts 10 and 11 that the air which enters the casing through the duct 10 is directed toward the lower apertures 26d, while that entering through duct 11 is directed to the upper apertures 26c. The two air quantities entering through the respective ducts are segregated from one another by the flow directing baffle and thus cannot intermix as they approach the stationary plate member.

Referring now again to the condition of the movable plates illustrated in FIGS. 4 and 5, it will be noted that with the plates in the position shown, the only air permitted to move past the stationary plate member will be that supplied through duct 11. In the present example this is the warm air duct. When it is desired to intermix air from duct 10 with that of duct 11, the movable plates are shifted through manipulation of rod 38 toward flange 37a. If an evenly proportioned mixture (50–50) is desired, the displacement of the movable plates will be enough to half uncover apertures 26c while at the same time half covering apertures 26d. Air from duct 10 will now be permitted to flow toward the discharge of the casing, as will air from duct 11, but from the latter in a reduced amount due to partial covering of apertures 26d.

The arrangement of apertures and movable cover portions therefor is such that for any given position of the movable plates 28 and 29, the total area open to flow is the same as for any other position. Thus, the discharge volume of the unit will remain substantially constant through the full range of temperature variation of the air delivered therefrom. It will be evident that the proportions of warm to cold air can be infinitely varied by the simple reciprocation of the movable plates 28 and 29 in one direction or the other between the end-most or limiting positions.

It is important to note that the air leaves the valve assembly on the downstream side and essentially parallel vertically segregated streams. Moreover, the upper and lower streams emerging through the respective upper and lower openings are staggered with respect to one another. By virtue of the tortuous path provided by the arcuate elements 25, the streams from the respective sets or rows of apertures 26c and 26d are merged with one another so that a uniform resultant is obtained prior to discharge from the casing. In other words, air emerging from the upper apertures 26c will be directed downwardly into the streams emerging from apertures 26d through interception of the former by the surface of the upper arcuate member 25. Intermixing is further promoted by the curved path defined between the lower and upper members 25 and the throttling effect achieved thereby.

The arcuate porous members 25 serve also to inhibit the transmission of sounds generated within the duct system and by flow of air through the valving member to the enclosure. High frequency sound waves are intercepted by the insulating members due to their staggered and overlapping arrangement and the porous character of the members along with the conformation given them serves to dampen the sound waves and prevent their reflection to the outlet of the box. The highly resilient character of the members 25 coupled with the lack of rigidity thereof (in the sense that they are unsupported by any solid backing members or facing) results in highly efficient noise reduction. Additional effectiveness is obtained by the forming of the resinous chamber 25a within the members, any deformation of the fiber structure being cushioned in part by the dead air contained therein.

It is important to observe also that the valving structure is such that the total volume of air that will be passed can be adjusted while still preserving the capability of controlling the mixture of hot and cold air. In FIGS. 4 and 5 the plate members 28 and 29 are shown in the relationship they occupy when maximum volume is desired. However, it will be evident that by rotating rod 38 the plates can be shifted relative to one another.

Assume now that it is desired to reduce the cross sectional area open to flow by one-fourth. This is accomplished by rotating the control rod 38 in a direction to result in shifting of the lower plate 29 to the right relative to the upper plate (as viewed in FIG. 5). Assuming that the upper plate 28 stays stationary, the openings 26d will be partially closed as a result of the shifting of the lower plate, the extent of closure depending on the revolutions made of the rod. In this example the degree of closure that has been selected is one-fourth.

It will be evident that now when the rod is shifted longitudinally to control mixing in the fashion earlier described (that is, to open the upper apertures 26c) the lower apertures will be even further closed. The total effective area open to flow at any time is only three-fourths of the total area of apertures 26c and 26d. Obviously the right-hand end of lower plate 29 will strike flange 37a when the upper apertures are three-fourths open, thus limiting further movement and stabilizing the valving assembly in its other limiting condition.

Through rotary manipulation of rod 38 any fraction of the total area of opening 26c and 26d can be selected as the area open to flow and the unit can thus be utilized to control mixing and still maintain a constant volumetric delivery rate which can be adjusted through the range of from 0 to 100% of the available air from the source.

In FIG. 7 I have shown a somewhat modified arrangement of the thrust arrangement for coupling the upper and lower plates 128 and 129, respectively. In this case, the brackets 141 and 142 connected with the plates have threaded extensions 138a and 138b connected therewith. A turnbuckle 151 connects the two extensions and it will be evident that by rotating the turnbuckle the plates can be shifted relative to one another, the direction depending on the direction of rotation. The control rod 138 for longitudinally shifting the plates as a whole is connected with a separate bracket 150 through the medium of a bolted connection.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a mixing and sound attenuation chamber for air conditioning systems having two sources of conditioned air, the combination of a tubular casing of rectangular cross section having top and bottom walls of greater width than the opposed side walls, an end wall on said casing having a pair of inlets spaced from one another in the direction of greatest width of the casing, each inlet communicating with one of said sources, a stationary plate member disposed within said casing and oriented in a plane intersecting the top, bottom and side walls thereof, said stationary plate member provided with a plurality of apertures therein arranged in two rows parallel with the top and bottom walls, the apertures of one row being staggered with respect to those of the other row, a flow directing baffle member interposed between said plate member and end wall and coextensive therewith, one edge of said baffle member adjoining said plate member between said rows and the other edge extending so as to separate the inlets and place them individually in communication with the separate rows of said apertures, a movable valving member covering one face of said stationary member and supported for sliding reciprocation with respect thereto lengthwise of said rows between opposed limiting positions, said movable valving member having openings similar to the apertures in the stationary plate member, but so arranged that when the movable valving member is in one limiting position certain openings of said movable valving member register with the apertures of the one row in said stationary plate member while the apertures of the other row in said stationary member remain covered and when in the other limiting position, the apertures of the other row are covered while those of the one row are open.

2. The combination as in claim 1 wherein said valving member includes two coplanar barrier members, each barrier member having a row of openings similar to a row of apertures in said plate member, and means connecting said barrier members with one another for movement as a unit, said means operable to vary the longitudinal position of one barrier member relative to the other barrier member.

3. The combination as in claim 1 including means in said casing providing a tortuous path for the air following its transmission through the apertures.

4. The combination as in claim 1 wherein said last named means includes acoustically absorbent elements disposed transverse to the direction of flow of the air.

5. The combination as in claim 1 wherein the openings of the movable plate member and apertures of the stationary member are so dimensioned and positioned relative one another that the cross sectional area open to flow through said members is constant for all positions of the movable plate member between its limiting positions.

6. In a mixing and sound attenuation chamber for air conditioning systems of the type having two sources of conditioned air, the combination of a casing having a pair of spaced inlets near one end for connection with the respective sources and also having a discharge outlet near the other end, a stationery plate member disposed within the casing and substantially closing the casing between said inlets and outlet, said stationery plate member provided with a plurality of apertures therein arranged in two rows parallel with one another and substantially side by side, a flow directing baffle interposed between said plate member and said inlets and coextensive with said plate member, one edge of said baffle member adjoining said plate member between said rows and the other edge extending so as to separate said inlets and place them individually in communication with the separate rows of said apertures, a movable valving member covering one face of said stationery member and supported for sliding reciprocation with respect thereto lengthwise of said rows between opposed limiting positions, said movable valving member having openings similar to the apertures in the stationery plate member, but so arranged that when the movable valving member is in one limiting position certain openings of said movable valving member register with the apertures of one row in said stationery plate member while the apertures of the other row in said stationery plate member remain uncovered and when in the other limiting position, the apertures of the other row are covered while those of the one row are open.

7. The combination as in claim 6 wherein the said valving member includes two coplanar barrier members, each barrier member having a row of openings similar to a row of apertures in said plate member, and means connecting said barrier members with one another for movement as a unit, said means operable to vary the longitudinal position of one barrier member relative to the other barrier member.

References Cited in the file of this patent

UNITED STATES PATENTS

| | | |
|---|---|---|
| 2,144,631 | Kurth | Jan. 24, 1939 |
| 2,442,963 | Sewell et al. | June 8, 1948 |
| 2,537,315 | Newton | Jan. 9, 1951 |
| 2,759,556 | Baruch | Aug. 21, 1956 |
| 2,820,406 | Argentieri | Jan. 21, 1958 |
| 2,891,576 | Kennedy | June 23, 1959 |
| 2,896,849 | Argentieri et al. | July 28, 1959 |
| 2,987,982 | Wilson | June 13, 1961 |

FOREIGN PATENTS

| | | |
|---|---|---|
| 516,580 | Belgium | Jan. 15, 1953 |
| 163,906 | Australia | July 5, 1955 |